United States Patent [19]
Chatelon

[11] 3,732,376
[45] May 8, 1973

[54] TIME DIVISION MULTIPLEX CODER

[75] Inventor: Andre Edourd Joseph Chatelon, Montrouge, France

[73] Assignee: International Standard Electric Corporation, New York, N.Y.

[22] Filed: Mar. 10, 1972

[21] Appl. No.: 233,648

[52] U.S. Cl. .........179/15 BY, 179/15 A, 179/15 BY
[51] Int. Cl. ...............................................H04j 3/12
[58] Field of Search ........................179/15 A, 15 BS, 179/15 BY

[56] References Cited

UNITED STATES PATENTS 3,602,647 8/1971 Kawashima ......................179/15 BY

*Primary Examiner*—Ralph D. Blakeslee
*Attorney*—C. Cornell Remsen, Jr. et al.

[57] ABSTRACT

The coder disclosed has two sample and hold circuits, one of which is primarily for sampling the analog signals for even numbered input sources and the other of which is for sampling the analog signals of odd numbered input sources. In addition, there is provided a coder centering circuit associated with each of the sample and hold circuits and a single feedback type coder coupled to each of the sample and hold circuits and each of the coder centering correction circuits. Two even numbered channels VO and V16 are employed for the transmission of signalling and synchronization data while an odd numbered channel V1 and and even numbered channel V16 is employed to actuate the two centering circuits. The even numbered channel sample and hold circuit has one odd numbered input signal coupled thereto during channel time V0, the analog coder centering reference signal coupled thereto during channel time V16 and the even numbered analog input signals coupled thereto during the remainder of the even numbered channel time. The odd numbered channel sample and hold circuit has the analog coder centering reference signal coupled thereto during channel time V1 and the remainder of the odd numbered analog input signals coupled thereto during the remainder of the odd numbered channel time slots. A delay arrangement is coupled to the output of the coder so that the output code occuring is channel time V0 is delayed to occur in time slot V1 thereby leaving the even numbered channel time V0 and V16 for the transmission of signalling and synchronization codes.

10 Claims, 7 Drawing Figures

TIME DIVISION MULTIPLEX CODER

BACKGROUND OF THE INVENTION

The present invention relates to a improvement in time division multiplex feedback coders designed to be associated with a PCM (pulse code modulation) telecommunications system having $m = 32$ channels, VO, V1 . . . V31, in which the channels V0 and V16 are reserved for the transmission of synchronization and signalling data. In the course of the description, such a system will be referred to as a "V0/V16 system".

The time division multiplex coding with a feedback coder generally comprises three successive operations for each channel: (1) the sampling and holding of the amplitude of the input analog signal in a capacitor, (2) the determination of the code characterizing the amplitude of the input analog signal stored in the capacitor and (3) the discharge of the capacitor. For coding in a $n$-bit code, the channel time slot is divided into $n$ bit time slots $t1$, $t2$ . . . $tn$, each of them being assigned to the determination of the value of a bit.

The feedback coding method is well known and it has been particularly described in the book "Notes on Analog-Digital Conversion Techniques" by A. K. Susskind (MIT Publication), pages 5.54 to 5.60.

It is understood that, in a channel time slot, the time available to execute the operations of charging and discharging of the holding capacitor is only a fraction of a bit time slot. This has no drawbacks for the charge of the memory or holding capacitor which can be easily achieved with a small time constant.

On the other hand, the discharge of this capacitor has to be a maximum if a residual crosstalk voltage is not to be added to the value of the next sample. It is understood that this residual voltage can be made smaller if the discharge time constant is small and the discharge time long.

The resistance of the discharge time constant is that of the discharge gate and the reduction of its value is limited by the allowable peak current through the gate.

To obtain an increase of the discharge time, it is known to couple, to a single coder two sampling and holding circuits which process alternately the analog data of the even channels and of the odd channels. Then a whole channel time slot is available for discharging the capacitor.

If this method is used in a V0/V16 system, it will be noted that the channels reserved for the transmission of signalling and synchronization codes or "codes CS" are both even channels.

There is generally provided, in a coder of the type, a centering correction circuit which enables the elimination of the coding error due to the fluctuations of DC voltages and to the variation of the characteristics of the components. Such a system is described in U. S. Pat. No. 3,365,713 whose disclosure is incorporated herein by reference.

To obtain the information to enable this centering correction a reference channel is sampled at regular intervals. This reference channel includes an analog signal of constant amplitude eo representing, for instance, a zero amplitude in a normal channel. In the special case when A.C. signals are encoded non symmetrically in $n$-bit codes, one of the codes $N = 2^{n-1} - 1$ or $N + 1 = 2^{n-1}$ is normally obtained for voltage $eo$, these codes differing in their most significant bit which is respectively 0 – 1. The correction information is contained in this bit and, when it is equal to 0 (1), it controls the variation of one of the D.C. voltages used in the coder in such a way that, at the next sampling, a code, the most significant bit of which is 1 (0), is obtained. The result is that the coding of the other channels is corrected by using a reference voltage of average value eo which is, therefore, centered, on the scale of the voltages to be coded, between the voltage value for which the code N is obtained and that for which the code N + 1 is obtained.

It should be noted that the reference channel is not connected to any source of signal to be coded for transmission and that the corresponding time slot is free, when transmitting, to send data such as a synchronization code.

The fluctuations and variations which have to be corrected act on the whole coding chain and, especially, on the sampling and holding circuit or circuits. Therefore, it is understood that, when two sampling and holding circuits are used, the centering correction has to be independently made for the even channel circuits and for the odd channel circuits. These operations necessitate the need of two reference channel time slots, an even channel time slot and an odd channel time slot.

Yet we have seen above that the two channel time slots which are free in a V0/V16 system (transmission time of the codes CS) were both even channel time slots.

SUMMARY OF THE INVENTION

Therefore, an object of the present invention is to provide an arrangement to obtain the operations of centering correction in a V0/V16 system. This arrangement includes means to code the analog signal received on the odd input A1 at a even channel time slot V0 and to delay the transmission of the code corresponding to the analog signal at input A1 until the occurrence of the next channel time slot V1. Then, the odd times V1 and the even times V16 are available as reference channel time slots for the centering correction operations.

Another object of the present invention is to provide a coder without crosstalk for a PCM transmission system in which two even channels are reserved for the transmission of signalling and/or synchronization codes.

A feature of the present invention is the provision of a time division multiplex coder for digital transmission system having $m$ channels with two even numbered channels being reserved for the transmission of signalling and synchronization data, where $m$ is equal to an integer greater than four, comprising: $(m-1)$ sources of analog signals; a second source of analog coder centering reference signal; first means to generate $m$ time sequential timing signals, each of the timing signals defining the time of occurrence of a different one of the $m$ channels; a first sample and hold circuit; a second sample and hold circuit; a first coder centering correction circuit coupled to the first sample and hold circuit activated during a given one of the even numbered ones of the $m$ timing signals, the given one of the even numbered ones of the $m$ timing signals defining one of the two even numbered channels; a second coder centering correction circuit coupled to the second sample and hold circuit activated during a given one of the odd numbered ones of the *m* timing signals; a feedback coder coupled to each of the first and second sample and hold circuits and to each of the first and second coder centering correction circuits; a first multiplexer coupled to the first means, the input of the first sample and hold circuit, a selected one of the odd numbered ones of the $(m-1)$ first sources, all the even numbered ones of the $(m-1)$ first sources, and the second source, the first multiplexer responding to the even numbered ones of the *m* timing signals to couple the analog signals from the selected one of the odd numbered ones of the *m* first sources, the even numbered ones of the *m* first sources and the second source to the first sample and hold circuit; a second multiplexer coupled to the first means, the second source, the remainder of the odd numbered ones of the $(m-1)$ first sources and the input of the second sample and hold circuit, the second multiplexer responding to the odd numbered ones of the *m* timing signals to couple the analog signals from the remainder of the odd numbered ones of the first sources and the second source to the second sampling and hold circuit; and an output circuit coupled to the output of the feedback coder to delay the digital information of the selected one of the odd numbered ones of the $(m-1)$ first sources one channel time slot to that one of the odd numbered ones of the m timing signals passing the analog signal of the second source through the second multiplexer to the second sample and hold circuit so that the even numbered channels are available for the transmission of signalling and synchronization data.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENT

TABLE I hereafter gives the main characteristics of the V0/V16 system and the definitions of the clock or timing signals used when coding.

Figure 1:
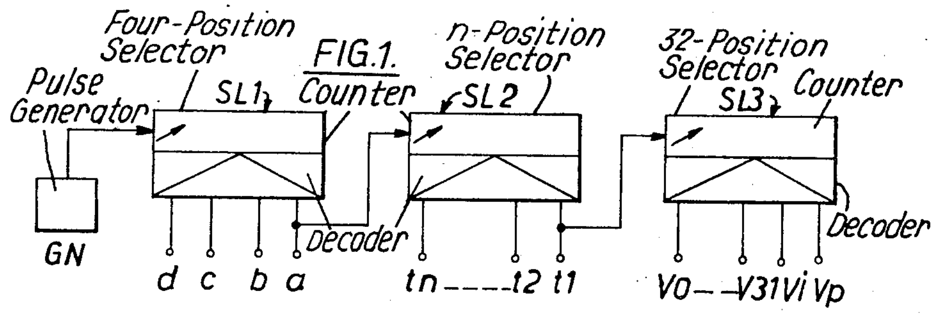
FIG. 1 illustrates one embodiment of a clock or timing signal source for employment in connection with the time division multiplex coder of FIG. 1.
Figures 2A, 2B, 2C, 2D, 2E:
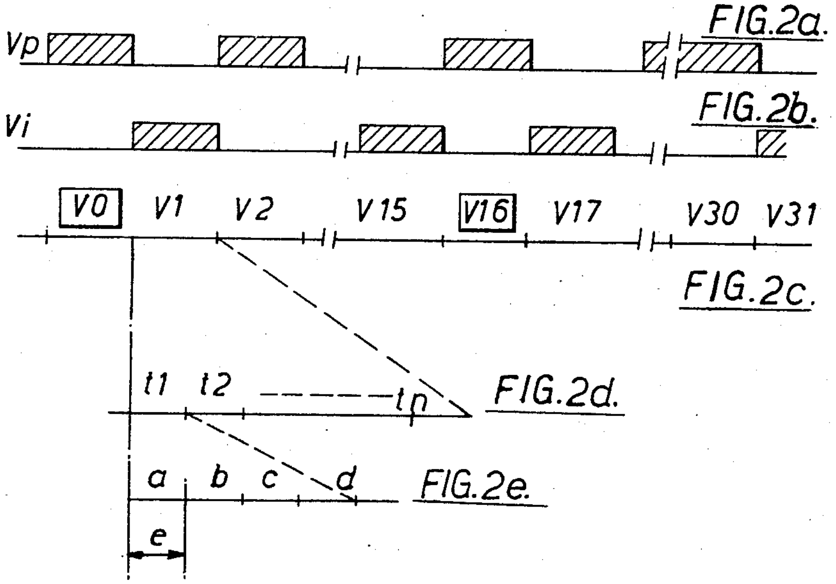
FIGS. 2*a* – 2*e* illustrate the timing diagrams of the timing signals produced by the circuit of FIG. 1.
Figure 3:
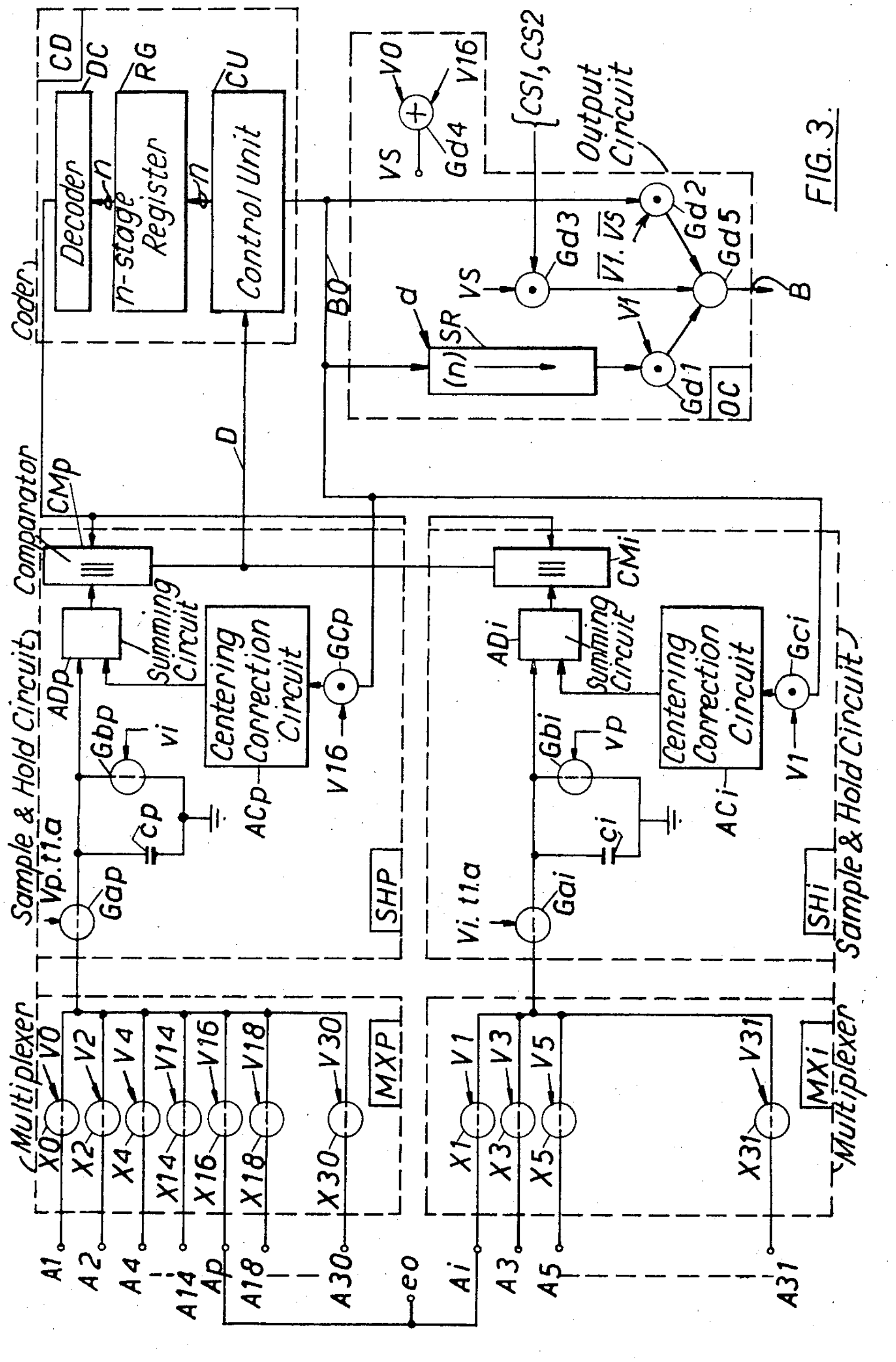
FIG. 3 illustrates in block diagram form one embodiment of a time division multiplex coder in accordance with the principles of the present invention.

FIG. 1 illustrates, as a non-limitative example, one embodiment of a clock or timing signal source employed with the system of FIG. 3. FIGS. 2*a* through 2*e* illustrate the timing diagrams of the different signals generated in the clock of FIG. 1.

The clock comprises: (1) The signal or pulse generator GN delivering signals having a repetition period of duration *e* (FIG. 2*e*);(2) The four-position selector SL1 in the form of a binary counter and decoder logic which advances under the control of the signals delivered by the generator GN and which provides the basic time slot signals *a, b, c, d* (FIG. 2*e*); (3) The *n*-position selector SL2 in the form of a binary counter and decoder logic which advances under the control of the signals a and which provides the bit signals *t*1, *t*2 . . . *tn* (FIG. 2*d*); and (4) The 32-position selector SL3 in the form of a binary counter and decoder logic which advances under the control of the signals *t*1. It provides, first, the channel time slot signals V0, V1 . . . V31 (FIG. 2*c*) and, second, the signals V*p* and V*i* (FIGS. 2*a* and 2*b*) which are taken on the least significant flip-flop of the counter of selector SL3. It should be noted in FIG. 2*c*, the channel time slots V0 and V16 reserved for transmitting the codes CS have been encircled.

TABLE I

CHARACTERISTICS OF THE "VO/V16 SYSTEM" AND OF THE CLOCK SIGNALS USED FOR CODING

| SYMBOLS | MEANING |
|---|---|
| Vp | Even channel time slots (FIG. 2*a*) |
| Vi | Odd channel time slots (FIG. 2*b*) |
| *m* = 32 | Number of channels |
| V0, V1 . . . V31 | Channel time slots (FIG. 2*c*) |
| A1, A3 . . . A31 | Odd analog inputs |
| A2,A4 . . . A14, A18 . . . A30 | Even analog inputs |
| Ap, Ai | Inputs to which are applied the reference voltage *eo* |
| *t*1, *t*2 . . . *tn* | Bit signals dividing each channel time slot into n equal time intervals (FIG. 2*d*) |
| *e* | Duration of a basic time slot |
| *a, b, c, d* | Basic time slot signals dividing each bit time slot into four time intervals of a duration *e* |
| V0, V16 | Channel time slots reserved for the transmission of CS codes |
| V1, V16 | Channel time slots reserved for the centering correction |

FIG. 3 illustrates the general block diagram of the coding circuit according to the present invention which comprises two separate sampling and holding circuits assigned, respectively, to the even and to the odd channels. These circuits which are referenced MX*p*/SH*p* and MX*i*/SH*i* are identical and the reference characters of their components will be followed by one of the letters *p* (even channel circuit) or *i* (odd channel circuit).

The sampling and holding circuit MX*p*/SH*p* assigned to the even channel time slots comprises: (1) The multiplexer MX*p* connected to the inputs A1, A2, A4, A6 . . . A14, A*p*, A18, A20 . . . A30. This circuit is controlled by the even channel time slot signals V0, V2 . . . V30 and it comprises the analog gates or coincidence gates X0, X2 . . . X30 implemented, for example, with field effect transistors; and (2) The sampling and holding circuit SH*p* comprising the holding capacitor C*p* with its charge control gate (coincidence gate) G*ap* and discharge control gate (coincidence gate) G*bp*, the analog comparator CM*p*, the centering correction circuit AC*p* receiving the information at the channel time slot V16 (AND gate G*cp*) and the summating circuit AD*p*.

This sampling and holding circuit operates in the following way: at an even channel time slot, such as V2, the gate X2 is open by the signal V2 and the gate G*ap* is open at the beginning of this time by the logic condition V*p*·*t*1·*a* (basic time slot *a* of each bit time *t*1 of an even channel time V*p*). The holding capacitor C*p* is then charged to the amplitude of the voltage present on the input A2 and remains charged until the immediately following signal V*i* which controls the opening of the discharge gate G*bp*. The sample is thus available during the whole channel time slot V2 and it is applied to the first input of the summation circuit AD*p*. The second input of circuit AD*p* receives a variable voltage provided by the circuit AC*p* and, as it has been stated hereinabove, the algebraic addition of the two voltages allows the adjustment of the centering of the coder CD once every frame. This operation is fully described in detail in the above cited U. S. Pat. No. 3,365,713.

The output signal of the circuit AD*p* is applied to the first input of the comparator CM*p*.

The sampling and holding circuit MX*i*/SH*i* assigned to the odd channel times comprises the circuit MX*i* and SH*i* which are identical to the circuits MX*p* and SH*p*. The value of the sample collected on one analog signal input, such as A3, is applied to the first input of the comparator CM*i* at time V3.

The coder CD, of conventional design, comprises the *n*-stage register RG in which builds up, during the times *t*1 to *tn*, the code corresponding to the amplitude of the sample stored in the capacitor C*p* or C*i*, the digital to analog decoder Dc which provides a voltage corresponding to this code which is applied to the second input of the comparators CM*p* and CM*i*. Control unit CU, such as disclosed in the above cited U. S. Pat. No. 3,365,713 with regard to control unit 90 and flip flop 122, controls the modification of the value of the code stored in register RG according to the result of the comparison provided, on the wire D, by the active one of the two comparators CM*p* and CM*i*. Control unit CU provides, on its output BO, the binary value of the bit computed at each digit time slot. It will be assumed that this value is available at the basic time slot *d*.

The output circuit OC coupled to output BO comprises the *n*-bit shift register SR, the AND gates G*d*1 through G*d*3 and the OR gates Gd4, G*d*5. The register SR receives a signal BO at a basic time slot each time that the coder CD provides a digit 1 and it receives also a clock signal at the time *d*. The register SR, therefore, contains the *n* last bits provided by the coder CD.

As noted thereinabove, the two channel time slots reserved in the V0/V16 system to perform the centering correction are even channel time slots whereas one of these operations must take place at an even channel time slot and the other at an odd channel time slot.

To overcome this drawback, and as is seen on FIG. 3, the analog signal received on the odd input A1 is coded during the time VO (circuits MX*p*, SH*p* and CD) and the code thus obtained is delayed by one channel time slot in the circuit OC in order to be transmitted during the time V1 (AND gate G*d*1). This channel time slot V1 is then available to perform the same operation for the set of circuits MX*p*, SH*p* and CD.

The TABLE II 2 hereafter gives the correspondence between the channel time slots, the coded analog channels and the transmitted codes.

TABLE II

CORRESPONDENCE BETWEEN THE CHANNEL TIMES, THE CODED CHANNELS AND THE TRANSMITTED CODES

| Channel times | Coded channels | Transmitted codes |
|---|---|---|
| V0 | A1 | CS1 |
| V1 | (Ai) | CA1 |
| V2 | A2 | CA2 |
| V3 | A3 | CA3 |
| . | . | . |
| . | . | . |
| . | . | . |
| V15 | A15 | CA15 |
| V16 | (Ap) | CS2 |
| V17 | A17 | CA17 |
| . | . | . |
| . | . | . |
| . | . | . |
| V30 | A30 | CA30 |
| V31 | A31 | CA31 |

It will be noted that the analog inputs which are brought to the reference voltage eo are references A*i* and A*p* in TABLE II and on FIG. 3 and that: (1) The synchronization and signalling codes transmitted during V0 and V16 are, respectively, referenced CS1 and CS2; and (2) The codes corresponding to the value of the signals applied on the inputs A1, A2 . . . A31 are referenced CA1, CA2 . . . CA31.

The delayed transmission of the code generated during the channel time slot V0 is controlled by the circuit OC the register SR of which contains the *n* last coded digits.

So the code CA1 is stored in this register at So end of time V0 and the opening of the gate G*d*1 allows its transmission during the time V1.

The other channel time slots are divided into two groups: (1) Synchronization and signalling channel time slots defined by the logic condition V*S* = V*0* + V16 (OR gate Gd4) during which the codes CS1, CS2 are transmitted by the opening of the AND gate G*d*3; and (2) Channel time slots for transmission of codes CA defined by the logical condition $\overline{V1}$. $\overline{VS}$ (AND gate G*d*2).

All these codes appear, in serial form, on the output B of the circuit OC.

While I have described above the principles of my invention in connection with specific apparatus it is to be more clearly understood that this description is made only by way of example and not as a limitation to the scope of my invention as set forth in the objects thereof and in the accompanying claims.

I claim:

1. A time division multiplex coder for a digital transmission system having m channels with two even numbered channels being reserved for the transmission of signalling and synchronization data, where *m* is equal to an integer greater than four, comprising:

(*m* – 1) first sources of analog signals;

a second source of analog coder centering reference signal;

first means to generate *m* time sequential timing signals, each of said timing signals defining the time of occurrence of a different one of said *m* channels;

a first sample and hold circuit;

a second sample and hold circuit;

a first coder centering correction circuit coupled to said first sample and hold circuit activated during a given one of the even numbered ones of said *m* timing signals, said given one of the even numbered ones of said *m* timing signals defining one of said two even numbered channels;

a second coder centering correction circuit coupled to said second sample and hold circuit activated during a given one of the odd numbered ones of said *m* timing signals;

a feedback coder coupled to each of said first and second sample and hold circuits and to each of said first and second coder centering correction circuits;

a first multiplexer coupled to said first means, the input of said first sample and hold circuit, a selected one of the odd numbered ones of said ($m-1$) first sources, all the even numbered ones of said ($m-1$) first sources, and said second source, said first multiplexer responding to the even numbered ones of said $m$ timing signals to couple the analog signals from said selected one of the odd numbered ones of said $m$ first sources, said even numbered ones of said $m$ first sources and said second source to said first sample and hold circuit;

a second multiplexer coupled to said first means, said second source, the remainder of the odd numbered ones of said ($m-1$) first sources and the input of said second sample and hold circuit, said second multiplexer responding to the odd numbered ones of said $m$ timing signals to couple the analog signals from said remainder of the odd numbered ones of said first sources and said second source to said second sampling and hold circuit; and an output circuit coupled to the output of said feedback coder to delay the digital information of said selected one of the odd numbered ones of said ($m-1$) first sources one channel time slot to that one of the odd numbered ones of said $m$ timing signals passing the analog signal of said second source through said second multiplexer to said second sample and hold circuit so that said two even numbered channels are available for the transmission of signalling and synchronization data.

2. A coder according to claim 1, wherein said output circuit includes a shift register coupled to the output of said feedback coder to provide said delay.

3. A coder according to claim 1, wherein said output circuit includes a shift register coupled to the output of said feedback coder, and an AND gate coupled to the output of said shift register and said first means responding to said one of the odd numbered ones of said $m$ tIming signals to provide said delay.

4. A coder according to claim 1, further including a third source of signalling and synchronization codes; and wherein said output circuit includes a shift register coupled to the output of said feedback coder, a first AND gate coupled to the output of said shift register and said first means responding to said one of the odd numbered ones of said $m$ timing signal to provide said delay and to provide at the output thereof the coded output of said selected one of the odd numbered ones of said ($m-1$) first sources, a second AND gate coupled to said third source and said first means responsive to said $m$ timing signals defining said two even numbered channels to provide at the output thereof said signalling and synchronization codes, a third AND gate coupled to the output of said coder and said first means responsive to said $m$ timing signals except for saId one of the odd numbered ones of said $m$ timing signals and said $m$ timings defining said two even numbered channels to provide at the output thereof coded output of said ($m-1$) analog signals other than said selected one of the odd numbered ones of said ($m-1$) analog signals, and an OR gate coupled to said first, second and third AND gates to provide a sequential code output for said time division multiplex coder.

5. A coder according to claim 1, wherein said first sample and hold circuit includes a first holding capacitor, a first coincidence device coupled between said first multiplexer and said first capacitor responding to even numbered ones of said $m$ timing signals to charge said first capacitor to the amplitude of Said analog signal being processed at the time, a second coincidence device coupled to said first capacitor responding to odd numbered ones of said $m$ timing signals to discharge said first capacitor, a first summing circuit coupled to said first capacitor and the output of said first centering correction circuit, and a first comparator coupled to the output of said first summing circuit and the feedback of said feedback coder to provide an input signal to said feedback coder during even numbered ones of said $m$ timing signals; and said second sample and hold circuit includes a second holding capacitor, a third coincidence device coupled between said second multiplexer and said second capacitor responding to odd numbered ones of said $m$ timing signals to charge said second capacitor to the amplitude of said analog signal being processed at the time, a fourth coincidence device coupled to said second capacitor responding to even numbered ones of said $m$ timing signals to discharge said second capacitor, a second summing circuit coupled to said second capacitor and the output of said second centering correction circuit, and a second comparator coupled to the output of said second summing circuit and the feedback of said feedback coder to provide an input signal to said feedback coder during odd numbered ones of said $m$ timing signals.

6. A coder according to claim 5, further including a first AND gate coupled between the output of said feedback coder and said first centering correction circuit responding to said given one of the even numbered ones of said $m$ timing signals to activate said first centering correction circuit; and a second AND gate coupled between the output of said feedback coder and said second centering correction circuit responding to said given one of the odd numbered ones of said $m$ timing signals to activate said second centering correction circuit.

7. A coder according to claim 1, further including a first AND gate coupled between the output of said feedback coder and said first centering correction circuit responding to said given one of the even numbered ones of said $m$ timing signals to activate said first centering correction circuit; and a second AND gate coupled between the output of said feedback coder and said second centering correction circuit responding to said given one of the odd numbered ones of said *m* timing signals to activate said second centering correction circuit.

8. A coder according to claim 1, wherein
said first multiplexer includes
*m*/2 first coincidence devices each responding to a different one of said even numbered ones of said *m* timing signals; and
said second multiplexer includes
*m*/2 second coincidence devices each responding to a different one of said odd numbered ones of said *m* timing signals.

9. A coder according to claim 8, wherein
said first sample and hold circuit includes
a first holding capacitor,
a first coincidence device coupled between said first multiplexer and said first capacitor responding to even numbered ones of said *m* timing signals to charge said first capacitor to the amplitude of said analog signal being processed at the time,
a second coincidence device coupled to said first capacitor responding to odd numbered ones of said *m* timing signals to discharge said first capacitor,
a first summing circuit coupled to said first capacitor and the output of said first centering correction circuit, and
a first comparator coupled to the output of said first summing circuit and the feedback of said feedback coder to provide an input signal to said feedback coder during even numbered ones of said *m* timing signals;
said second sample and hold circuit includes
a second holding capacitor,
a third coincidence device coupled between said second multiplexer and said second capacitor responding to odd numbered ones of said *m* timing signals to charge said second capacitor to the amplitude of said analog signal being processed at the time,
a fourth coincidence device coupled to said second capacitor responding to even numbered ones of said *m* timing signals to discharge said second capacitor,
a second summing circuit coupled to said second capacitor and the output of said second centering correction circuit, and
a second comparator coupled to the output of said second summing circuit and the feedback of said feedback coder to provide an input signal to said feedback coder during odd numbered ones of said *m* timing signals;
further including
a first AND gate coupled between the output of said feedback coder and said first centering correction circuit responding to said given one of the even numbered ones of said *m* timing signals to activate said first centering correction circuit;
a second AND gate coupled between the output of said feedback coder and said second centering correction circuit responding to said given one of the odd numbered ones of said *m* timing signals to activate said second centering correction circuit; and
a fifth source of signalling and synchronization codes; and wherein
said output circuit includes
a shift register coupled to the output of said feedback coder,
a third AND gate coupled to the output of said shift register and said third means responding to said one of the odd numbered ones of said *m* timing signals to provide said delay and to provide at the output thereof the coded output of said selected one of the odd numbered ones of said (*m*—1) third sources,
a fourth AND gate coupled to said fifth source and said third means responsive to said *m* timing signals defining said two even numbered channels to provide at the output thereof said signalling and synchronization codes,
a fifth AND gate coupled to the output of said coder and said third means responsive to said *m* timing signals except for said one of the odd numbered ones of said *m* timing signals and said *m* timings defining said two even numbered channels to provide at the output thereof coded output of said (m—1) analog signals other than said selected one of the odd numbered ones of said (m—1) analog signals, and an OR gate coupled to said third, fourth and fifth AND gates to provide a sequential code output for said time division multiplex coder.

10. A coder according to claim 1, wherein
*m* is equal to 32;
said first means generate thirty two time sequential timing signals, V0, V1, V2 . . . V29, V30 and V31 having V0, V2, V4 . . . V26, V28 and V30 as even numbered ones of said timing signals and V1, V3, V5 . . . V27, V29 and V31 as odd numbered ones of said timing signals;
said two even numbered channels being defined by timing signals V0 and V16;
said given one of the even numbered ones of said timing signals is V16;
said given one of the odd numbered ones of said timing signals is V1;
said first multiplex responds to timing signal V0 to couple the analog signal of said selected one of the odd numbered ones of said (*m*—1) first sources to said first sample and hold circuit; and
said digital information of said selected one of the odd numbered ones of said (*m*—1) first sources is delayed from that one of said channels defined by timing signal V0 to that one of said channels defined by timing signal V1.

* * * * *